Nov. 1, 1927.
G. F. COLBERT ET AL
1,647,857
NONGLARE MIRROR
Filed March 19, 1927
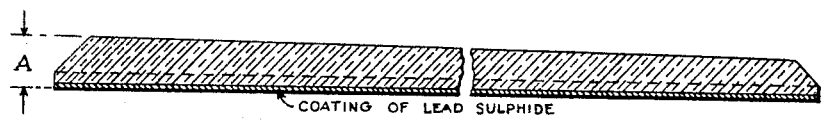
COATING OF LEAD SULPHIDE
INVENTORS
Geo. F. Colbert and
William H. Colbert,
BY
their ATTORNEYS.

UNITED STATES PATENT OFFICE.

GEORGE FIELDING COLBERT AND WILLIAM HARRY COLBERT, OF PITTSBURGH, PENNSYLVANIA.

NONGLARE MIRROR.

Application filed March 19, 1927. Serial No. 176,326.

Our present invention relates to non-glare mirrors and has for an object the production of a mirror which will eliminate glare from bright sources of illumination without interfering with the clearness and definition of the reflected field of view under either natural or artificial light conditions.

The more special objects of the present improvements will be better understood after a brief consideration of the essential problems that must be solved in the successful commercial production of articles of this class.

In our United States Patent 1,603,936 of April 30, 1926, we have disclosed the production of a metallic film which is peculiarly adapted to produce a non-glare mirror when employed as a reflective surface.

In the drawing forming a part hereof, we have diagrammatically illustrated a mirror embodying our invention, it being understood that the angularity between the front and rear faces thereof is somewhat exaggerated for purposes of illustration.

In the successful production of non-glare mirrors there are several important matters to be considered. One is what may be termed the selective reflecting power of the coating or film that is used to cut down the intensity of the reflected image and thereby avoid the phenomenon of glare. We have found that in order to meet the usual conditions in night driving the intensity of certain portions of the reflected light which forms the primary image must be reduced to approximately one-third of that of the incident light. As is well known, light in general consists of visible radiations of various wave lengths which are perceived by the eye as colors and ordinarily combined to form what is known as white light. The eye is not equally sensitive to all such radiations or colors but most strongly reacts to that part of the spectrum which lies between the yellowish-green and bluish-green portion of the spectrum—the particular region of the spectrum that produces the greatest effect being determined, to some extent, by the brightness of the illumination. In the production of non-glare mirrors it is therefore of primary importance to use reflecting surfaces that have the greatest reflective power in the red and blue-violet parts of the spectrum and the minimum reflective power—or the maximum absorptive power—in the yellowish-green-bluish portion of the spectrum.

We have discovered that one of the materials which is peculiarly well adapted to secure this selective reflection is lead sulphide; and in the patent previously referred to the method of depositing such films of reflective material on glass plates is described. Other sulphides which possess the same general characteristics of selective reflection, and which therefore appear to be well adapted for our purpose, are the sulphides of antimony $(Sb_2S_3)$, cadmium $(CdS)$, cobalt $(CoS)$, bismuth $(Bi_2S_3)$, thallium $(Tl_2S)$ and $(Tl_2S_3)$, mercury $(HgS)$, etc., but so far as we have determined the lead sulphide produces the best results.

In the ordinary form of mirror, such, for example, as a silver surface protected by glass or a similar transparent substance, multiple images of light radiating sources are produced. The primary or metallic surface produces what may be termed the primary image by reason of its high reflective power. The front face of the protective material, for example glass, is also a reflecting surface and it produces what may be termed a secondary image. In addition there are a plurality of reflections between these two surfaces which result in the production of what may be termed a series of tertiary images. Where the reflective power of the primary or metallic surface is very high the brightness of the primary image is so far in excess of the brightness of any of the other images that the eye ignores all but the primary image. For this reason the phenomenon of multiple reflection or multiple images is never observed and consequently occasions no difficulty in the use of such mirrors. If, however, the primary reflecting surface is of such character as to absorb a relatively large portion of the incident light, or has such a selective reflectivity as is necessary in the production of a non-glare mirror, then the primary image is much reduced in brightness; and as a result the secondary and tertiary images not only become apparent but the secondary image is of such relative intensity as to occasion dangerous confusion unless means are employed to eliminate this difficulty.

We have discovered that the most satisfactory way of accomplishing this is to so construct or select the protective plate by which the reflecting film is supported, that the secondary and tertiary images are so nearly superimposed on the primary image that the eye is not capable of distinguishing these as separate images.

It is of course apparent that exact parallelism of the two reflecting surfaces would, theoretically, obviate the difficulty but it would be impractical, except in the production of precision optical instruments, to grind and polish the two opposed surfaces of the supporting plate to produce such exact parallelism. Such a procedure would be absolutely prohibitive in the commercial manufacture of non-glare mirrors as automobile accessories. In order to produce such mirrors at a cost that will make them available for this and similar uses it is necessary to employ, as a source of supply for the protective plate, some relatively cheap and abundant commodity such as the ordinary plate glass of commerce. The opposed surfaces of such plate glass are in the majority of this product, inclined to each other at a very considerable angle, and the separation of the two images that are formed respectively by the front surface and by the rear coated surface of the glass is twice as great as the relative inclination of the two surfaces themselves. If, therefore, such surfaces are out of parallelism in the neighborhood of two minutes of arc, the primary and secondary images that are formed by reflections therefrom may be separated by nearly five minutes of arc; and under such circumstances one looking into such a mirror at a bright object—such as a headlight of an automobile—would observe (in the case of non-glare mirrors) at least two relatively bright and well separated images of the object. As a matter of fact, six or eight such images might be observed under the conditions assumed.

The angular resolving power of the eye—i. e., the capacity of the eye to perceive as separate details two or more closely adjacent objects—is usually assumed to be about 20 seconds (20″) of arc. If this criterion is used as a basis for determining the possible limits of non-parallelism of the primary and secondary reflecting surfaces one would be led to the conclusion that the permissible inclination of such surfaces should not exceed 10″ of arc. But we have discovered and proved by many experiments that a materially greater inclination than this is allowable in the case of our improved non-glare mirrors without producing the phenomena of "dual images". The primary reason for this is that the resolving power of the eye is not only directly reduced by an augmented brightness of the observed objects, but also by an increase in the mean wave length of the light producing the images. Where the primary reflecting surface of a non-glare mirror possesses a maximum selective reflection in the red and orange-yellow portions of the spectrum and absorbs from 60% to 80% of the bluish-green or yellowish-green light, the mean wave length of the image producing light rays is materially increased, with the result that the apparent separation of the primary and secondary images that may be produced by non-parallelism of the two opposed reflecting surfaces is materially decreased, and this, in turn, materially increases the permissible relative inclination of those surfaces without producing apparent multiplicity of images.

We have, therefore, discovered that by properly selecting the material for producing the primary reflecting film, we can avoid the tremendous expense necessary in producing true parallelism of the opposed surfaces of the protecting plate and thus produce a non-glare mirror which may be effectively employed as an automobile accessory and which may be manufactured at a cost commensurate with its use. By employing the reflecting film herein specified, we are able to obtain the necessary selective reflection and absorption and at the same time employ a support or protective plate, such as glass, in which the opposed surfaces are not parallel but are inclined to each other at any angle up to approximately one minute of arc; the maximum permissible limit with a lead sulphide coat being reached when this angular inclination is about 80″ of arc. By the employment of such a primary reflecting surface, as is herein described, we produce a mirror having the desirable non-glare characteristics and at the same time eliminate the objectionable multiple image phenomenon, in so far as the eye is concerned.

An additional advantage of the non-glare mirror herein described is that it increases the apparent visibility of the reflected field as viewed through fog or mist or clouds of dust. This is occasioned by the fact that the light making up the reflected image is largely from the red or orange-red part of the spectrum. It is well-known that the longer wave-length rays, such as the red and orange-red, are not diffracted or scattered by small particles to the same extent as the shorter wave length rays; and consequently a mirror which reflects these longer wave lengths and absorbs the shorter wave lengths will produce a clearer, brighter image where the incident light traverses mist or dust or fog, than can be produced by the ordinary commercial mirror.

In the drawing, which is merely illustrative, we have diagrammatically shown a mirror having a coating on its rear surface of lead sulphide. As shown, the front face of the mirror, i. e. the face opposed to the coated surface is at a slight angle A to the coated face, but it is to be understood that where lead sulphide is employed as the reflective coating or a material having the light absorbing and light reflecting characteristics herein described, the angle A must not be materially greater than 80 seconds of arc.

The preferred procedure in manufacturing non-glare mirrors in accordance with our invention, contemplates cutting the plate glass or other supporting material in pieces having the dimensions of the finished mirrors. Each of these pieces is then examined to determine the angularity of the opposed faces. Any method of so examining the plates may be employed but it is of course apparent that the method utilized should be one which will neither necessitate the use of expensive apparatus nor the service of highly skilled labor. As the support plates are tested for angularity those which exhibit a greater angularity of the opposed surfaces than is permissible for use in connection with the particular reflecting surface to be employed are discarded, although they may be employed in the manufacture of mirrors, such as silver surface mirrors, where the phenomenon of multiple image is not objectionable.

Those pieces in which the opposed surfaces are inclined to each other at an angle falling within the permissible angle are then prepared for coating with the material constituting the primary reflecting surface by being washed so as to remove grease or other foreign material.

In carrying out the present invention we prepare the following solutions:

*Solution No. 1.*

| | Ounces. |
|---|---|
| Lead acetate | 0.5 |
| Water | 12 |

*Solution No. 2.*

| | Ounces. |
|---|---|
| Sodium hydroxide or other alkali agent | ¾ |
| Water | 12 |

*Solution No. 3.*

| | Ounces. |
|---|---|
| Thio urea | 1 |
| Water | 48 |

After the preparation of these solutions the glass plates to be coated are laid on a table which is preferably maintained at such a temperature as will maintain the plates at approximately 95° F. The surface of each plate to be coated is uppermost and is located as nearly horizontal as is practical. Solutions No. 1 and No. 3 are then mixed in the proportions of four parts of solution No. 3 and one part of solution No. 1. Thereafter solution No. 2 is added to the mixture in the proportions of one part of No. 2 solution to five parts of the combined solution, i. e., the mixture of No. 1 and No. 3.

This mixture is then poured onto the exposed or upper face of each of the plates located on the table, the arrangement being such that the upper surface of each plate is completely covered by a uniform film of the solution which is retained on the plate by its surface tension. If each of the plates is so located that its upper face is substantially horizontal it will be found that a relatively thick film will be retained on the plate and that the primary reflecting surface will start to deposit on the upper surface of the plate within a few minutes. The operation of thus depositing the primary reflecting surface on the plates will be completed in 10 or 15 minutes, the exact time depending somewhat on the temperature of the plates.

Where a solution such as above specified is employed it is unnecessary to handle the plates carefully since the lead sulphide deposited on them is relatively tough and resists abrasion. The plates are then removed from the table and are washed, after which the coated surface may be shellacked or otherwise provided with a protective coating. Where the primary reflecting coating is lead sulphide, as here contemplated, it is unnecessary to employ an opaque protective coating, although a pigment may be and preferably is employed in the shellac or other covering material for the purpose of improving the appearance of the mirrors.

It will of course be apparent that where the edges of the support plates are to be ground or beveled these operations may be completed after the plates have been subjected to the selective test, and either before or after the coating operation.

What we claim is:

1. A non-glare mirror comprising a transparent plate having two substantially plane but non-parallel surfaces the relative angular inclination of which is not materially greater than 80 seconds of arc, and having one of such surfaces coated with a lustrous coating capable of reflecting less than 50% of the light incident thereon.

2. A non-glare mirror which comprises a transparent plate having two substantially plane surfaces whose relatively angular inclination is not materially greater than 80 seconds of arc, and having one of the said surfaces coated with an optically absorbent film whose selective reflecting power is not materially greater than 40% of the incident light.

3. A non-glare mirror consisting of a plate of transparent material whose opposing surfaces are inclined to each other by an angular amount not materially greater than 80 seconds of arc, and one of said surfaces being provided with a reflecting coating whose selective reflectivity is not materially less than 30% nor materially greater than 40% for yellowish-green light.

4. A non-glare mirror consisting of a plate of transparent material with two opposing substantially plane surfaces inclined at an angle not materially greater than 80 seconds of arc, and having one of the said surfaces provided with a metallic film whose selective reflecting power is a maximum for the red end of the spectrum.

5. A non-glare mirror which comprises a substantially plane, non-parallel plate of glass whose opposing surfaces are inclined at an angle of not materially more than 80 seconds of arc, and which is provided on one of the said surfaces with a selectively reflecting coating of metallic sulphide capable of absorbing at least 60% of the yellowish-green portion of the incident light.

In testimony whereof, we have hereunto set our names this 17th day of March, 1927.

GEORGE FIELDING COLBERT.
WILLIAM HARRY COLBERT.